(12) United States Patent
Hartular et al.

(10) Patent No.: US 7,750,604 B2
(45) Date of Patent: Jul. 6, 2010

(54) CIRCUITS AND METHODS FOR BATTERY CHARGING

(75) Inventors: Alex Hartular, San Jose, CA (US); Eftimie Caraghiorghiopol, San Jose, CA (US); Dan Simion, Santa Clara, CA (US)

(73) Assignee: O2Micro, Inc., Santa Clara, CA (US)

( * ) Notice: Subject to any disclaimer, the term of this patent is extended or adjusted under 35 U.S.C. 154(b) by 258 days.

(21) Appl. No.: 11/899,913

(22) Filed: Sep. 7, 2007

(65) Prior Publication Data
US 2008/0197811 A1 Aug. 21, 2008

Related U.S. Application Data

(60) Provisional application No. 60/901,755, filed on Feb. 16, 2007.

(51) Int. Cl.
*H02J 7/04* (2006.01)
*H02J 7/16* (2006.01)
*H02J 7/00* (2006.01)

(52) U.S. Cl. ............ 320/139; 320/162; 320/132

(58) Field of Classification Search .......... 320/152, 320/139
See application file for complete search history.

(56) References Cited

U.S. PATENT DOCUMENTS

| 5,808,447 | A | * | 9/1998 | Hagino | 320/139 |
|---|---|---|---|---|---|
| 6,124,698 | A | * | 9/2000 | Sakakibara | 320/110 |
| 6,337,557 | B1 | * | 1/2002 | Kates et al. | 320/112 |
| 2005/0093517 | A1 | * | 5/2005 | Suzuki | 320/141 |

* cited by examiner

*Primary Examiner*—Edward Tso
*Assistant Examiner*—Ahmed Omar

(57) ABSTRACT

Circuits and methods for battery charging are disclosed. In one embodiment, the battery charging circuit comprises an AC to DC converter, a charging control switch, and a charger controller. The AC to DC converter provides a charging power to a battery pack. The charging control switch is coupled between the AC to DC converter and the battery pack. The charging control switch transfers the charging power to the battery pack. The charger controller detects a battery status of the battery pack and controls the charging control switch to charge the battery pack in a continuous charging mode or a pulse charging mode according to the battery status. The charger controller also controls the AC to DC converter to regulate the charging power according to the battery status.

21 Claims, 7 Drawing Sheets

CIRCUITS AND METHODS FOR BATTERY CHARGING

RELATED APPLICATION

This application claims priority to U.S. Provisional Application No. 60/901,755, filed on Feb. 16, 2007, the specification of which is hereby incorporated in its entirety by reference.

BACKGROUND

1. Field of the Invention

The present invention relates to circuits and methods for charging a battery pack.

2. Description of the Related Art

FIG. 1 illustrates a block diagram of a conventional battery charging circuit 100. The conventional battery charging circuit 100 includes an alternating current (AC) power source 102, an alternating current (AC) to direct current (DC) converter 104, a switch 106, a pulse type charger controller 112, and a battery pack 110. The AC power source 102 provides an AC voltage. The AC to DC converter 104 converts the AC voltage to a DC voltage. The DC voltage is provided to the battery pack 110 through the switch 106. The switch 106 is switched on and off by the pulse type charger controller 112, such that current pulses averaging at a desired charging current may be generated and provided to the battery pack 110. Specifically, while the switch 106 is switched on, a current is provided to the battery pack 110. While the switch is switched off, no current is provided to the battery pack 110. As such, the battery pack 110 is charged in a pulse charging mode. The battery pack 110, the switch 106, and the pulse type charger controller 112 constitute a remote control loop, which regulates a charging process of the battery pack 110 according to a status of the battery pack 110. However, the pulse type charger controller 112 utilized herein is typically complicated and expensive.

FIG. 2 shows a schematic diagram of a conventional AC to DC converter 200 which can be utilized in the conventional battery charging circuit 100 for providing a DC voltage. Elements labeled the same in FIG. 1 have similar functions and will not be repetitively described herein for purposes of brevity and clarity. The AC to DC converter 200 includes a diode bridge 202 and a capacitor 204. The diode bridge 202 converts an AC voltage from the AC power source 102 to a pulsing voltage. The capacitor 204 filters the pulsing voltage to output a DC voltage. However, when the battery pack 110 has been deeply discharged, the charging current provided by the AC to DC converter 200 may have negative effects on the battery life. Additionally, if the AC power source 102 is unstable the DC voltage will also be unstable, which can also shorten the battery life.

FIG. 3 shows a schematic diagram of another conventional AC to DC converter 300 which can be utilized in the conventional battery charging circuit 100 for providing a DC voltage. Elements labeled the same in FIGS. 1 and 2 have similar functions and will not be repetitively described herein for purposes of brevity and clarity. The AC to DC converter 300 includes the diode bridge 202, the capacitor 204 and a DC to DC converter 302. The DC to DC converter 302 includes a flyback transformer 304, a rectifying diode 306, a filtering capacitor 308, an error amplifier 310, a feedback network comprising a resistor 312, a resistor 314, an optoisolator 316, a switch mode power supply (SMPS) controller 318, and a flyback switch 320. The DC voltage produced at the capacitor 204 is converted to a DC voltage DC_IN by the flyback transformer 304, the rectifying diode 306 and the filtering capacitor 308. Furthermore, a voltage divider constituted by the resistors 312 and 314 derives a feedback voltage VFB from the DC voltage DC_IN. The feedback voltage VFB is compared with a reference voltage VREF1 at the error amplifier 310. An output of the error amplifier 310 is coupled to a primary side of the flyback transformer 304 sequentially through the optoisolator 316, the SMPS controller 318, and the flyback switch 320, thereby regulating a voltage level of the DC voltage DC_IN until the feedback voltage VFB is equal to the reference voltage VREF1. As such, the elements in the DC to DC converter 302 constitute a local control loop to regulate the DC voltage DC_IN. As such, the DC voltage DC_IN will be regulated by the local loop according to the reference voltage VREF1.

Similarly, when the battery pack 110 has been deeply discharged, the charging current provided by the AC to DC converter 300 may have negative effects on the battery life. Furthermore, the local control loop and the remote control loop (in FIG. 1) will make stability issues complicate and cause transient responses in the battery charging circuit 100.

FIG. 4 is a schematic diagram of another conventional battery charging circuit 400. Elements labeled the same in FIGS. 1, 2 and 3 have similar functions and will not be repetitively described herein for purposes of brevity and clarity. The battery charging circuit 400 includes the AC power source 102, the AC to DC converter 104, a continuous type charger controller 402, and the battery pack 110. The continuous type charger controller 402 regulates the charging process of the battery pack 110 according to a status of the battery pack 110. Furthermore, a microcontroller 404 may be employed to collect signals representing the status of the battery pack 110 and then send these signals to the continuous type charger controller 402. As such, the continuous type charger controller 402, the microcontroller 404, and the battery pack 110 constitute a remote control loop. The continuous type charger controller 402 provides a continuous charging current to the battery pack 110. In this instance, the battery pack 110 is charged in a continuous charging mode.

However, such local control loop and the remote control loop still make stability issues complicate and cause transient responses in the battery charging circuit 400. Additionally, the component count is large.

SUMMARY

Embodiments in accordance with the present invention provide a battery charging circuit. The battery charging circuit comprises an AC to DC converter, a charging control switch, and a charger controller. The AC to DC converter provides a charging power to a battery pack. The charging control switch is coupled between the AC to DC converter and the battery pack. The charging control switch transfers the charging power to the battery pack. The charger controller detects the battery status of the battery pack and controls the charging control switch to charge the battery pack in a continuous charging mode or a pulse charging mode according to the battery status. The charger controller also controls the AC to DC converter to regulate the charging power according to the battery status.

BRIEF DESCRIPTION OF THE DRAWINGS

Advantages of the present invention will be apparent from the following detailed description of exemplary embodiments thereof, which description should be considered in conjunction with the accompanying drawings, in which.

DETAILED DESCRIPTION

Reference will now be made in detail to embodiments of the present invention. While the invention will be described in conjunction with the embodiments, it will be understood that they are not intended to limit the invention to these embodiments. On the contrary, the invention is intended to cover alternatives, modifications and equivalents, which may be included within the spirit and scope of the invention as defined by the appended claims.

Figure 1:
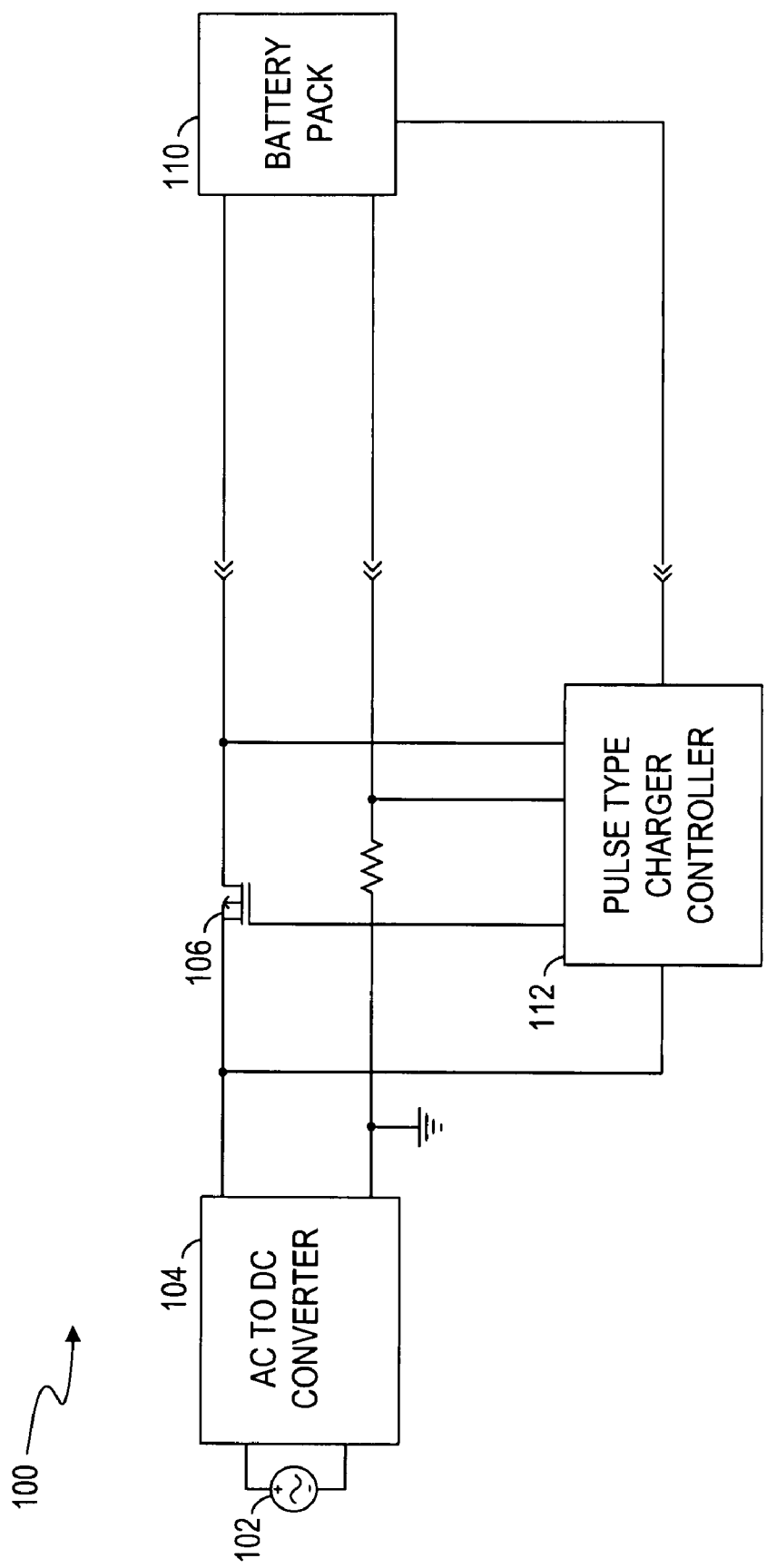
FIG. 1 is a block diagram of a conventional battery charging circuit.
Figure 2:
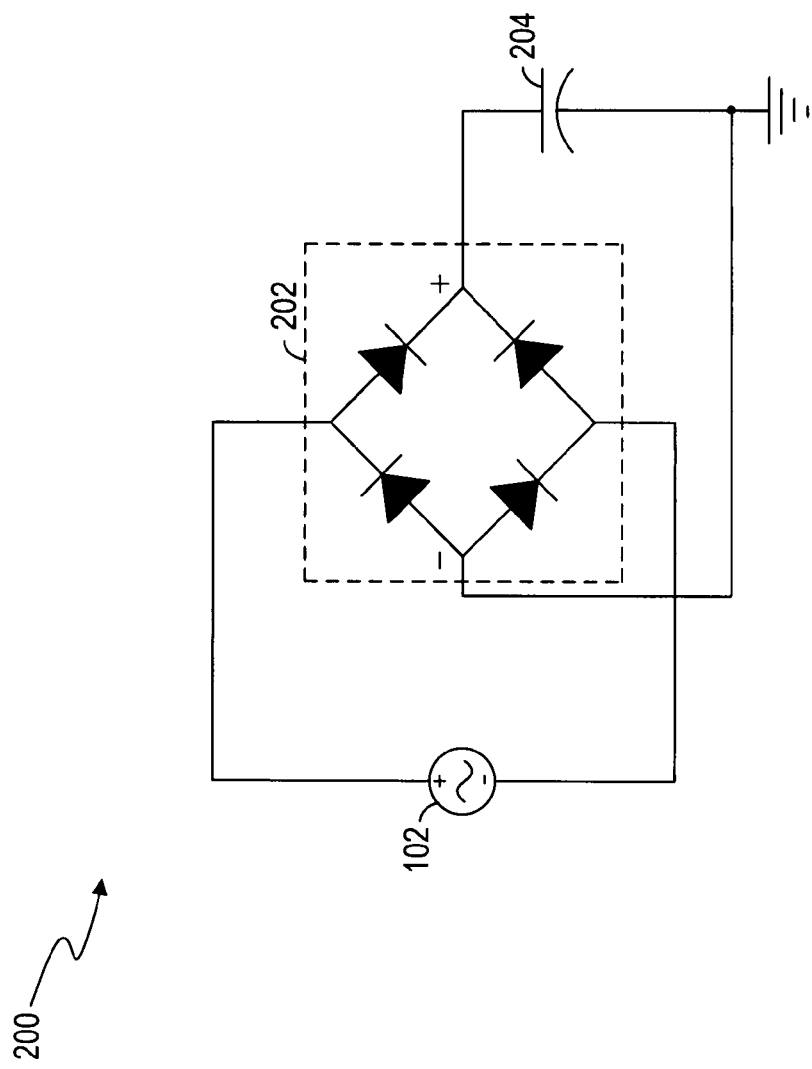
FIG. 2 is a schematic diagram of a conventional AC to DC converter.
Figure 3:
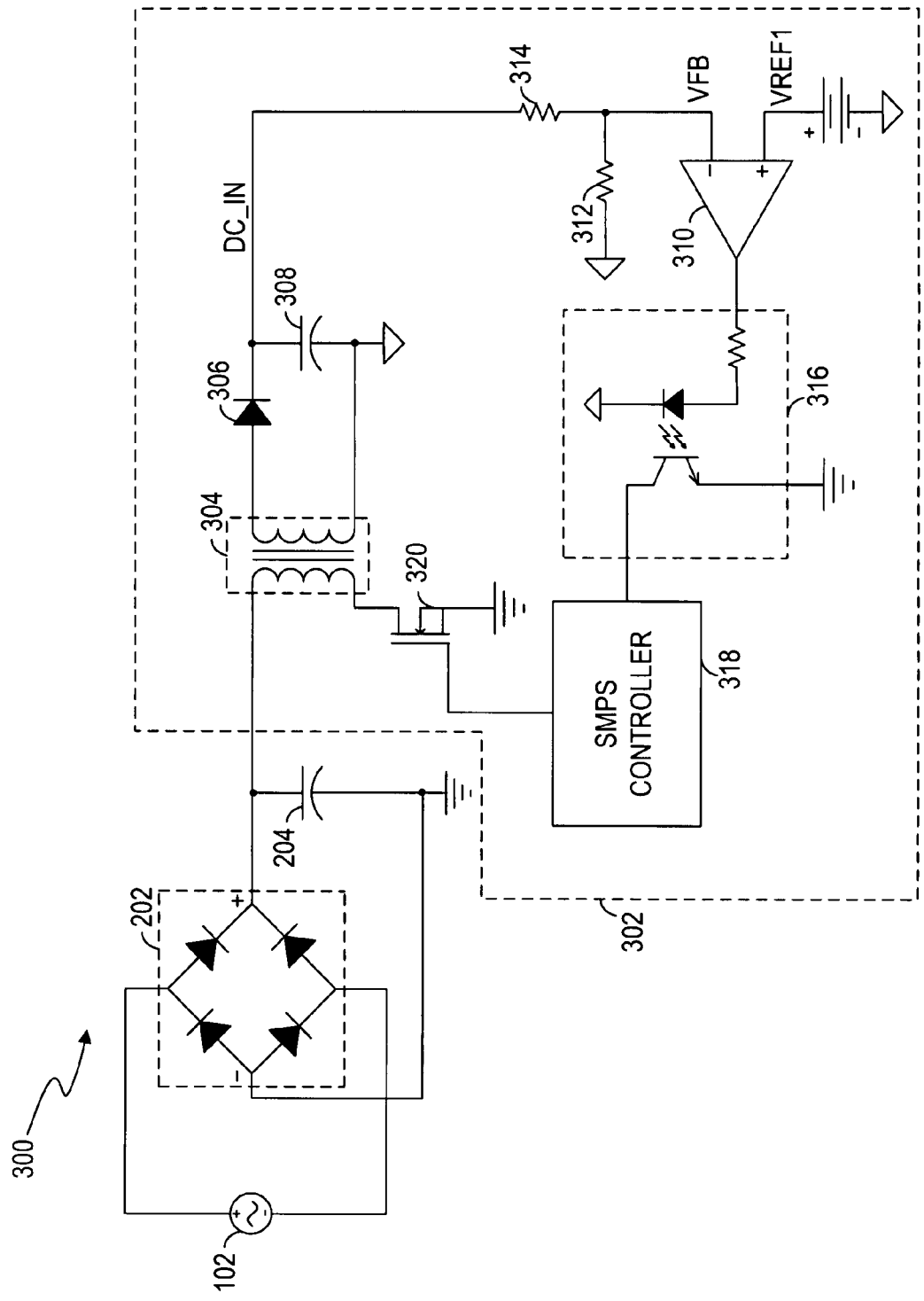
FIG. 3 is a schematic diagram of another conventional AC to DC converter.
Figure 4:
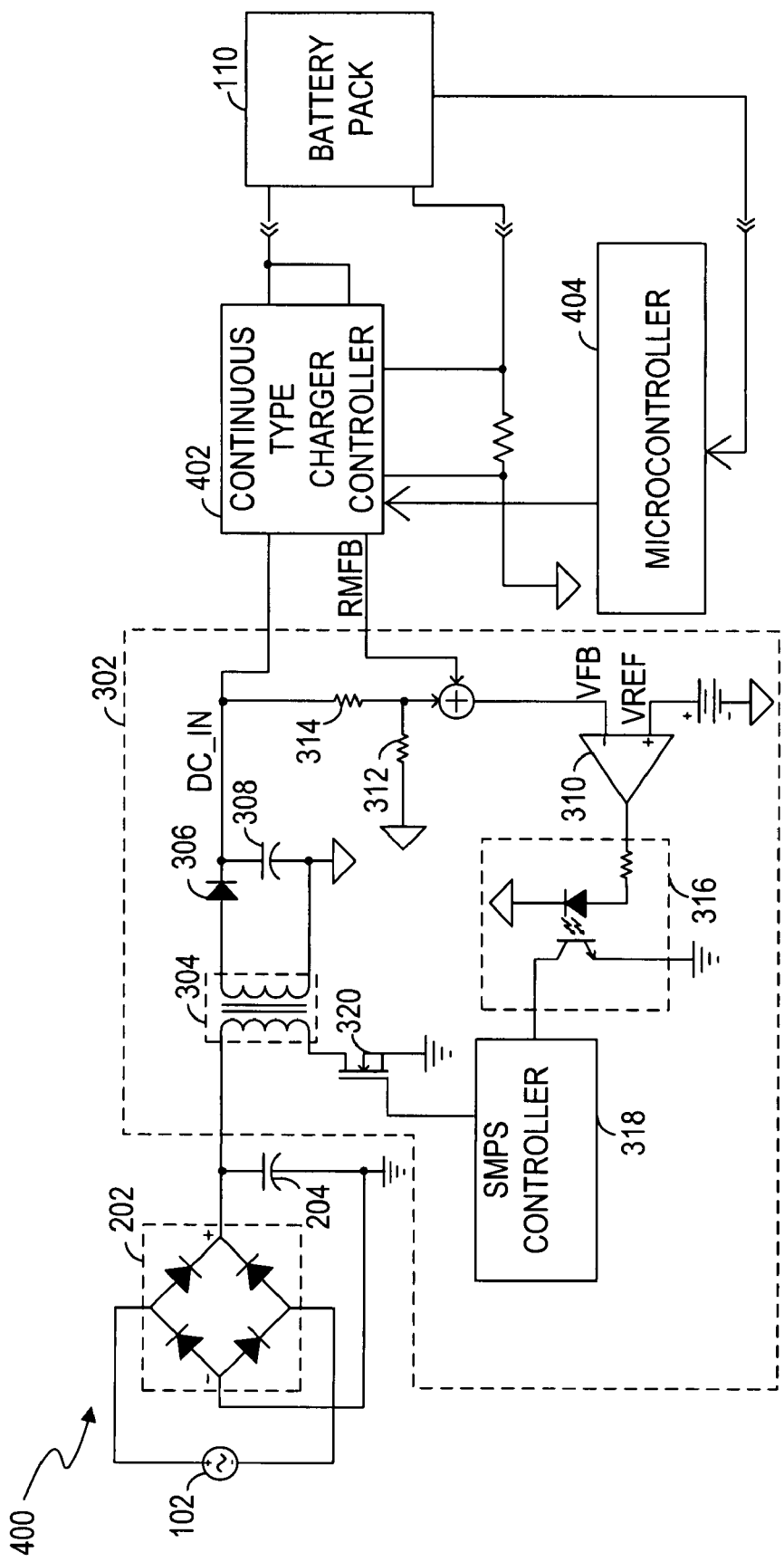
FIG. 4 is a schematic diagram of another conventional battery charging circuit.
Figure 5:
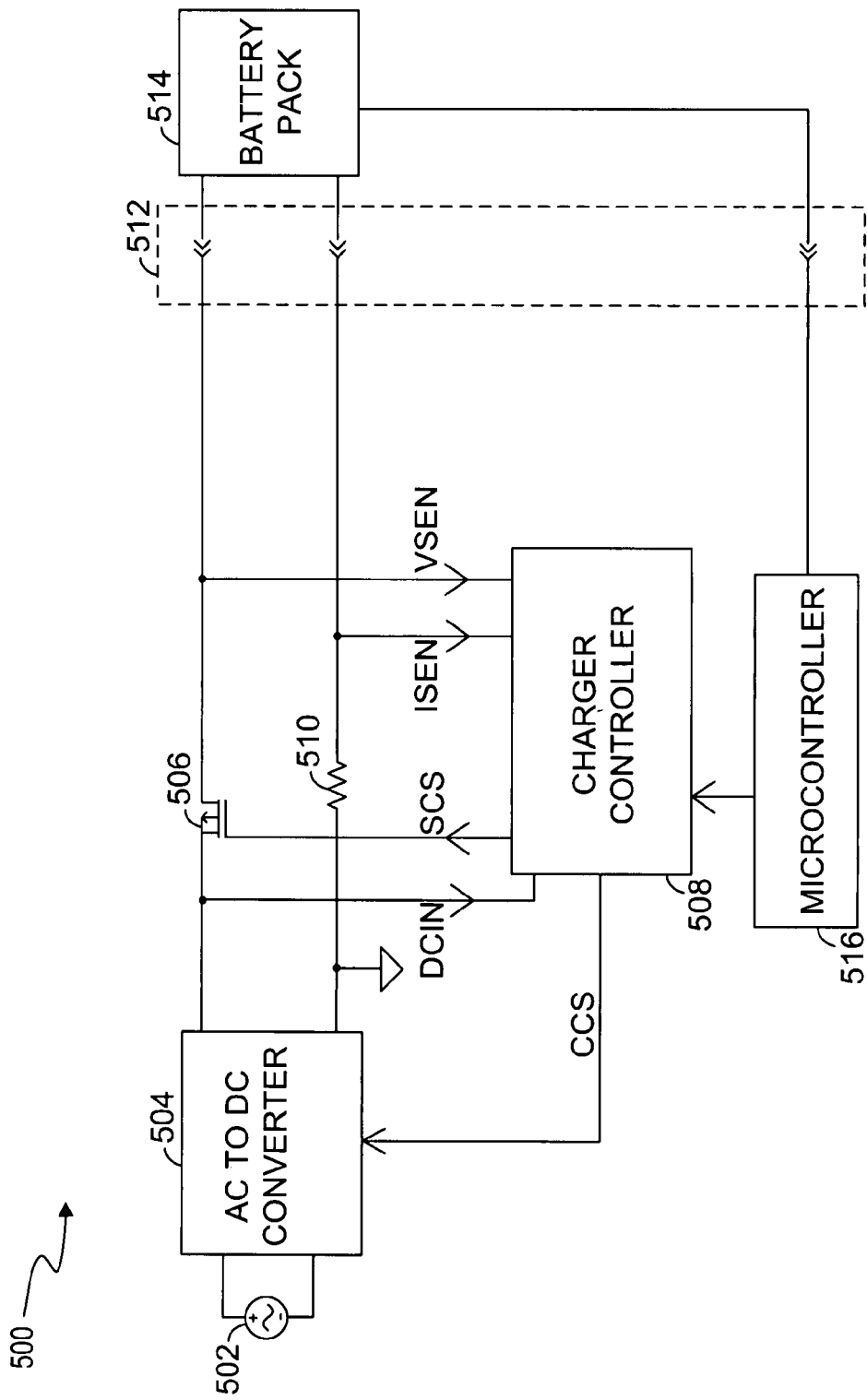
FIG. 5 is a block diagram of a battery charging circuit, in accordance with one embodiment of the present invention.

FIG. 5 illustrates a block diagram of a battery charging circuit 500, in accordance with one embodiment of the present invention. The battery charging circuit 500 includes an AC power source 502, an AC to DC converter (controllable power converter) 504, a charging control switch 506, a charger controller 508, a current sensing resistor 510, a slide connector 512, and a battery pack 514, in one embodiment. The AC to DC converter 504 receives an AC power of the AC power source 502 and provides a charging power (e.g., regulated DC voltage DCIN) to charge the battery pack 514. The charging control switch 506 coupled between the AC to DC converter 504 and the battery pack 514 is used to transfer the charging power to the battery pack 514. The charger controller 508 can sense a plurality of parameters related to a status of the battery pack 514, i.e. the regulated DC voltage DCIN, a charging current ISEN of the battery pack 514, and a battery voltage VSEN of the battery pack 514. The charger controller 508 senses the charging current ISEN through the current sensing resistor 510, in one embodiment. The current sensing resistor 510 is coupled to the battery pack 514. The charger controller 508 provides a converter control signal CCS to the AC to DC converter 504 according to the status of the battery pack 514, in one embodiment. The charger controller 508 can also provide a switch control signal SCS to the charging control switch 506 according to a status of the battery pack 514. The slide connector 512 couples the battery pack 514 with the other elements in the battery charging circuit 500, i.e. the charging control switch 506, the charger controller 508, and the current sensing resistor 510.

Advantageously, the AC to DC converter 504, the charging control switch 506, the charger controller 508, the current sensing resistor 510, the slide connector 512, and the battery pack 514 constitute a global control loop, in one embodiment. The global control loop can regulate a charging process of the battery pack 514 dynamically according to a status of the battery charging circuit 500, i.e. the battery voltage VSEN, the charging current ISEN, and the regulated DC voltage DCIN. With the global control loop, there is no need to have any additional control loops, in one embodiment. As such, the problem of complicating stability issues and transient responses can be avoided. Also, as the blocks within the global control loop can be integrated together, the number of components can be reduced. Consequently, the overall cost of the battery charging circuit 500 can be reduced.

In addition, the AC to DC converter 504 and the charging control switch 506 in FIG. 5 can charge the battery pack 514 in a continuous (linear) charging mode or a pulse charging mode according to the switch control signal SCS. In other words, the switch control signal SCS can select a charging mode for the battery pack 514 from at least a continuous (linear) charging mode and a pulse charging mode. In the continuous charging mode, the charging control switch 506 is controlled in a linear mode, in one embodiment. In the pulse charging mode, the charging control switch 506 is controlled in a switch mode (in which the charging control switch 506 is switched either on or off), in one embodiment. In one embodiment, the continuous charging mode can be used to charge the battery pack 514 during a pre-conditioning (trickle charging) stage when a voltage of the battery pack 514 is below a predetermined minimum voltage VMIN in order to ensure the battery safety. In one embodiment, a relatively low charging current and/or a relatively low charging voltage are provided to the battery pack 514 in the continuous charging mode. For example, the AC to DC converter 504 is driven to provide a predetermined minimum charging voltage during the pre-conditioning stage. In one embodiment, the pulse charging mode can be used to charge the battery pack 514 when the voltage of the battery pack 514 is greater than the predetermined minimum voltage VMIN.

Moreover, the AC to DC converter 504 can charge the battery pack 514 in a constant current phase or a constant voltage phase according to the converter control signal CCS. That is, the converter control signal CCS can select a charging phase from at least a constant current phase and a constant voltage phase. In the constant current phase, the AC to DC converter 504 provides a constant charging current to charge the battery pack 514. In the constant voltage phase, the AC to DC converter 504 provides a constant charging voltage to charge the battery pack 514. In one embodiment, the battery pack 514 is charged in the constant current phase if the voltage of the battery pack 514 is less than a predetermined maximum battery voltage, and the battery pack 514 is charged in the constant voltage phase if the voltage of the battery pack 514 reaches the predetermined maximum battery voltage. In one embodiment, the pulse charging mode can comprise both the constant current phase and the constant voltage phase.

Furthermore, the charger controller 508 may also regulate the charging process of the battery pack 514 according to alarm signals, configurations signals, and a charge status signal of the battery pack 514. In one embodiment, alarm signals may indicate abnormal conditions of the battery pack 110, such as over temperature, over voltage, and over current conditions. When an abnormal condition occurs, the AC to DC converter 504 is driven to provide the predetermined minimum charging voltage. In one embodiment, configuration signals may indicate configuration parameters of the battery pack 110, such as cell number and chemistry characters of each cell. In one embodiment, a charge status signal may indicate whether the battery pack 110 is fully charged or not. When the battery pack 110 is fully charged, the charging process is terminated and the AC to DC converter 504 is driven to provide the predetermined minimum charging voltage. As such, the AC to DC converter 504 can be driven to provide the predetermined minimum charging voltage in a condition selected from at least the pre-conditioning stage, the charging termination and the abnormal condition. Furthermore, these signals may be sent to the charger controller 508 directly via an information bus. Alternatively, as shown in FIG. 5, a microcontroller 516 may be employed to collect these signals (e.g., from a gas gauge) via the information bus and then send these signals to the charger controller 508.

Figure 6:
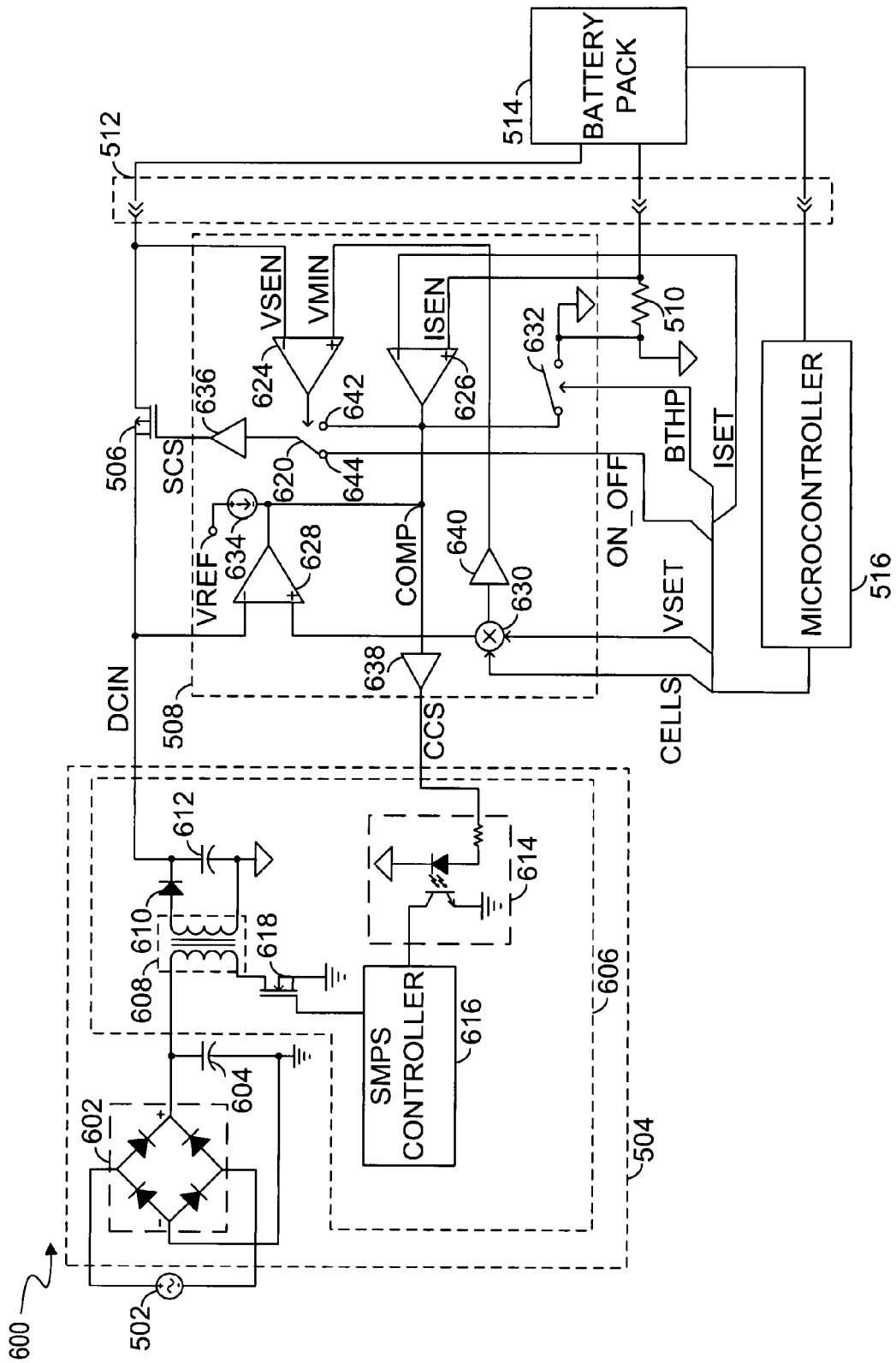
FIG. 6 is a schematic diagram of a battery charging circuit, in accordance with one embodiment of the present invention.

FIG. 6 illustrates a schematic diagram of the battery charging circuit 600, in accordance with one embodiment of the present invention. Elements labeled the same in FIG. 5 have similar functions and will not be repetitively described herein for purposes of brevity and clarity. The battery charging circuit 600 includes the AC power source 502, the AC to DC converter (controllable power converter) 504, the charging control switch 506, the charger controller 508, the current sensing resistor 510, the slide connector 512, and the battery pack 514, in one embodiment. These elements constitute the global control loop which can regulate the charging process dynamically according to the status of the battery charging circuit 600, i.e. the battery voltage VSEN, the charging current ISEN, and the regulated DC voltage DCIN. Furthermore, the global control loop may also regulate the charging process of the battery pack 514 according to a signal CELLS, a signal VSET, a signal ISET, a charging control signal ON_OFF, and a signal BTHP. The signal CELLS indicates a cell number of the battery pack 514, in one embodiment. The signal VSET indicates a predetermined maximum cell voltage of the battery pack 514, in one embodiment. The signal ISET indicates a predetermined maximum charging current, in one embodiment. The charging control signal ON_OFF controls the charging control switch 506 in pulse charging mode, and also indicates whether the battery pack 514 is fully charged or not, in one embodiment. The signal BTHP indicates an abnormal condition of the battery pack 514, such as an over temperature condition, an over voltage condition or an over current condition, in one embodiment. These signals may be sent to the charger controller 508 directly via an information bus. Alternatively, as shown in FIG. 6, the microcontroller 516 may be employed to collect these signals via the information bus and then send these signals to the charger controller 508.

The AC to DC converter 504 (e.g., a switch mode power supply (SMPS)) includes a diode bridge 602, a capacitor 604, and a DC to DC converter 606, in one embodiment. The diode bridge 602 and the capacitor 604 convert an AC voltage of the AC power source 502 to a DC voltage. The DC to DC converter 606 includes a transformer (e.g., a flyback transformer) 608, a diode (e.g., a rectifying diode) 610, a capacitor (e.g., a filtering capacitor) 612, a converter control interface (e.g., an optoisolator device) 614 providing galvanic isolation between the AC to DC converter 504 and the battery pack 514, an SMPS controller 616, and a switch (e.g., a flyback switch) 618, in one embodiment. The diode 610 and the capacitor 612 are coupled to a secondary side of the transformer 608. The transformer 608, the diode 610, and the capacitor 612 convert the DC voltage to the regulated DC voltage DCIN, in one embodiment. In one embodiment, the DC to DC converter 606 receives the converter control signal CCS from the charger controller 508 and thus regulating an output of the AC to DC converter 504 according to the converter control signal CCS. More specifically, the converter control interface 614 receives the converter control signal CCS from the charger controller 508. The converter control signal CCS regulates a primary side of the transformer 608 sequentially through the converter control interface 614, the SMPS controller 616, and the switch 618. As such, the output of the AC to DC converter 504 (e.g., DC voltage DCIN) can be regulated according to the converter control signal CCS. Advantageously, there is no local loop within the AC to DC converter 504. Instead, the AC to DC converter 504 is included in the global control loop within the battery charging circuit 600. With a single loop in the battery charging circuit 600, the problem of complicating stability issues and transient responses of the conventional battery charging circuit can be solved.

The charger controller 508 includes a comparator 624, a current error amplifier (e.g., an operational transconductance amplifier (OTA)) 626, a voltage error amplifier (e.g., an OTA) 628, a selector 620, a multiplier 630, a protection switch 632, a current source 634, a driver 636, and buffers 638 and 640, in one embodiment. The comparator 624 compares the battery voltage VSEN of the battery pack 514 with a predetermined minimum battery voltage VMIN, in one embodiment. The predetermined minimum battery voltage VMIN can be provided by the multiplier 630. The multiplier 630 multiples the signal CELLS by the signal VSET and takes a portion of the product as the predetermined minimum battery voltage VMIN, in one embodiment. The predetermined minimum battery voltage VMIN can be provided to the comparator 624 through the buffer 640. The comparator 624 controls the selector 620 according to a result of the comparing, in one embodiment. Advantageously, the battery pack 514 is charged in the continuous charging mode if a voltage of the battery pack 514 is less than the predetermined minimum battery voltage VMIN, and the battery pack is charged in the pulse charging mode if the voltage of the battery pack 514 is greater than the predetermined minimum battery voltage VMIN, in one embodiment.

Moreover, a positive terminal of the current source 634 is connected to a reference voltage VREF, in one embodiment. The reference voltage VREF may be a reference voltage generated within the charger controller 508 or set by a user. A negative terminal of the current source 634, an output of the current error amplifier 626, and an output of the voltage error amplifier 628 are connected at a common terminal COMP, in one embodiment. As a result, the current error amplifier 626 and the voltage error amplifier 628 are OR-tied together. In one embodiment, the voltage at the common terminal COMP can be regulated between zero and VREF. The current error amplifier 626 and the voltage error amplifier 628 are both included in the global control loop, in one embodiment.

When the battery voltage VSEN is less than the predetermined minimum battery voltage VMIN, the selector 620 selects a node 642, in one embodiment. In this instance, the driver 636 is coupled to the common terminal COMP by the selector 620. As a result, the continuous charging mode can be selected. In the continuous charging mode, the current error amplifier 626 is active and the voltage error amplifier 628 is inactive, in one embodiment. The switch control signal SCS is driven by the voltage at the common terminal COMP. The voltage at the common terminal COMP is produced according to the output of the current error amplifier 626, the reference voltage VREF and the current source 634, in one embodiment. The current error amplifier 626 senses a predetermined pre-conditioning charging current from the signal ISET, in one embodiment. The signal ISET indicates the predetermined maximum charging current, in one embodiment. The predetermined pre-conditioning charging current is a portion of the predetermined maximum charging current, in one embodiment. As such, the voltage at the common terminal COMP is regulated by current error amplifier 626, in one embodiment. Consequently, the switch control signal SCS is regulated by the current error amplifier 626, in one embodiment. The switch control signal SCS (e.g., an analog signal) is provided through the driver 636 to control the charging control switch 506 in a linear mode, in one embodiment. In the linear mode, the charging control switch 506 operates as a linear regulator.

Similarly, in the continuous charging mode, the converter control signal CCS is also driven by the voltage at the common terminal COMP, in one embodiment. The buffer 638 sends the converter control signal CCS to the AC to DC converter 504. The DC to DC converter 606 in the AC to DC converter 504 provides the regulated output voltage (e.g., DC voltage DCIN) according to the converter control signal CCS, in one embodiment. In one embodiment, the AC to DC converter 504 is driven to provide the regulated DC voltage DCIN equal to a predetermined minimum charging voltage. The charging control switch 506 transfers the regulated DC voltage DCIN in the linear mode and charges the battery pack 514 with the pre-conditioning charging current, in one embodiment.

When the battery voltage VSEN rises above the predetermined minimum battery voltage VMIN, the comparator 624 controls the selector 620 to select a node 644, in one embodiment. As such, the driver 636 receives a charging control signal ON_OFF (e.g., a digital signal). As a result, the pulse charging mode can be selected. In the pulse charging mode, the charging control switch 506 operates in a switch mode in which the charging control switch 506 is switched either on or off. The switch control signal SCS is provided by the charging control signal ON_OFF. The charging control switch 506 is switched on and off by the driver 636 according to the charging control signal ON_OFF, in one embodiment. If the battery pack 514 is not fully charged, the charging control switch 506 will be switched on and off alternately, such that current pulses averaging at a desired charging power may be generated and provided to the battery pack 514. If the battery pack 514 is fully charged, the charging control switch 506 will be switched off by the charging control signal ON_OFF.

The pulse charging mode can include the constant current phase and the constant voltage phase. In one embodiment, when the battery voltage VSEN is greater than the predetermined minimum battery voltage VMIN and is less than the predetermined maximum battery voltage, the battery charging circuit 600 charges the battery pack 514 in the constant current phase. The multiplier 630 multiples the signal CELLS by the signal VSET and obtains the predetermined maximum battery voltage, in one embodiment. In the constant current phase, the current error amplifier 626 is active and the voltage error amplifier 628 is inactive. Similarly, the converter control signal CCS is driven by the voltage at the common terminal COMP. The voltage at the common terminal COMP is generated according to the current source 634, the charging current ISEN, and a predetermined maximum charging current, in one embodiment. The current error amplifier 626 senses the predetermined maximum charging current from the signal ISET. The buffer 638 sends the converter control signal CCS to the AC to DC converter 504. The DC to DC converter 606 in the AC to DC converter 504 provides the regulated output (e.g., DC voltage DCIN) according to the converter control signal CCS. The charging control switch 506 transfers the regulated DC voltage DCIN in the switch mode. As such, current pulses averaging at the predetermined maximum charging current are provided to the battery pack 514, in one embodiment. When the battery pack 514 is charged in the constant current phase, the battery voltage VSEN increases with the charging process, in one embodiment.

In one embodiment, when the battery voltage VSEN reaches the predetermined maximum battery voltage, the battery charging circuit 600 charges the battery pack 514 in the constant voltage phase. In the constant voltage phase, the voltage error amplifier 628 is active and the current error amplifier 626 is inactive. Similarly, the converter control signal CCS is driven by the voltage at the common terminal COMP, in one embodiment. The voltage error amplifier 628 generates the voltage at the common terminal COMP to keep the regulated DC voltage DCIN equal to the predetermined maximum battery voltage, in one embodiment. The voltage error amplifier 628 senses the predetermined maximum battery voltage from the multiplier 630, in one embodiment. The buffer 638 sends the converter control signal CCS to the AC to DC converter 504. The DC to DC converter 606 in the AC to DC converter 504 provides the regulated output (e.g., DC voltage DCIN) according to the converter control signal CCS. The regulated DC voltage DCIN is regulated to the predetermined maximum battery voltage, in one embodiment. The charging control switch 506 transfers the regulated DC voltage DCIN in the switch mode. When the battery pack 514 is charged in the constant voltage phase, the charging current ISEN decreases with the charging process, in one embodiment.

When the charging current ISEN decreases to zero, the charging process is completed, in one embodiment. The charging control signal ON_OFF switches the charging control switch 506 off. The voltage error amplifier 628 is active and the current error amplifier 626 is inactive. Advantageously, the voltage error amplifier 628 provides the converter control signal CCS to maintain the regulated DC voltage DCIN equal to a predetermined minimum charging voltage, preparing for a next charging task, in one embodiment. In addition, when the battery is absent from the charger or when the battery is under any undesirable conditions (e.g., over-voltage, over-current, and over-temperature), the voltage error amplifier 628 can also provide the converter control signal CCS to maintain the regulated DC voltage DCIN equal to a predetermined minimum charging voltage, in one embodiment. The predetermined minimum charging voltage can be obtained from the multiplier 630. For example, the multiplier 630 multiples the signal CELLS by the signal VSET and takes a portion of the product as the minimum charging voltage. The buffer 638 sends the converter control signal CCS to the AC to DC converter 504. The AC to DC converter 504 provides the predetermined minimum charging voltage according to the converter control signal CCS. As a result, the AC to DC converter 504 can provide a predetermined minimum charging voltage in a predetermined condition comprising a pre-conditioning stage, a charging termination, and an abnormal condition, in one embodiment.

Furthermore, the switch 632 is connected to the common terminal COMP. The switch 632 receives the alarm signal BTHP indicative of the abnormal condition of the battery pack 514, for example, an over temperature condition, an over voltage condition, or an over current condition. When the abnormal condition happens, the switch 632 is switched on. As a result, the common terminal COMP is connected to ground, and the charging process is terminated. When the charging process is terminated, the charger controller 508 sends the converter control signal CCS for controlling the AC to DC converter 504 to provide the predetermined minimum charging voltage, in one embodiment.

Referring to FIGS. 5 and 6, the charging control switch 506 can be a metallic oxide semiconductor field effect transistor (MOSFET) or other known devices, as long as the functionality as described is achieved. The converter control interface 614 can be an optoisolator device or other known devices for providing a galvanic isolation from the AC power source 502. It will be understood that various additions, modifications and substitutions may be made therein without departing from the spirit and scope of the principles of the present invention as defined in the accompanying claims.

Figure 7:
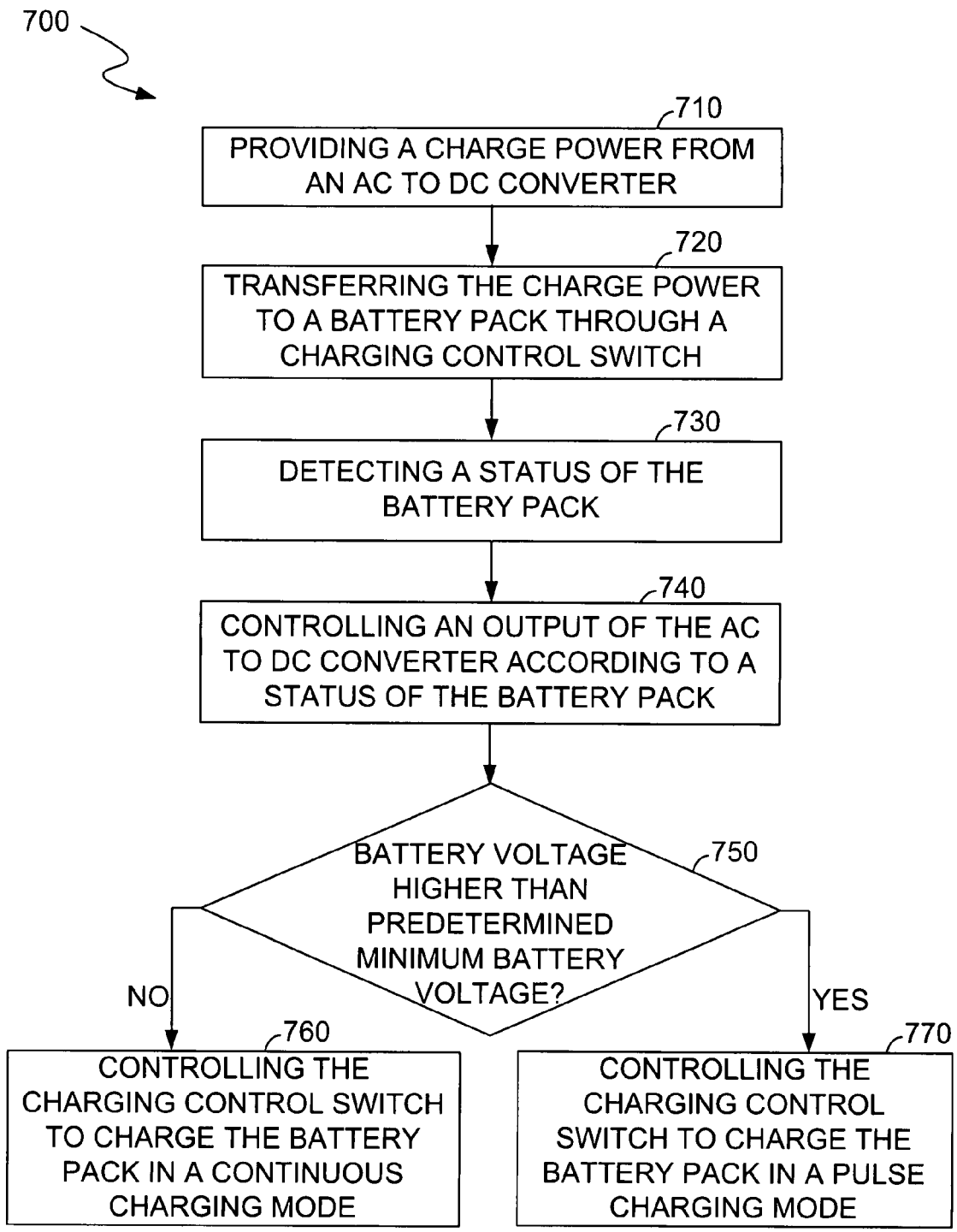
FIG. 7 is a flowchart of a method of implementing battery charging in a battery charging circuit, in accordance with one embodiment of the present invention.

FIG. 7 is a flow chart 700 of a method of implementing battery charging in a battery charging circuit, in accordance with one embodiment of the present invention. Although specific steps are disclosed in FIG. 7, such steps are exemplary. That is, the present invention is well suited to performing various other steps or variations of the steps recited in FIG. 7. FIG. 7 is described in combination with FIG. 6.

In block 710, a charge power (e.g., charge current and/or charge voltage) is provided from an AC to DC converter 504. In one embodiment, the charge power can be a DC voltage and/or a DC current regulated from an AC power source 502 by the AC to DC converter 504.

In block 720, the charge power is transferred from the AC to DC converter 504 to a battery pack 514 through a charging control switch 506. In one embodiment, the charging control switch 506 transfers the charge power in a linear mode or a switch mode according to a switch control signal SCS provided by a charger controller 508.

In block 730, a status of the battery pack 514 can be monitored by the charger controller 508. In one embodiment, the charger controller 508 may monitor a battery voltage, a charging current, and the regulated DC voltage.

In block 740, an output of the AC to DC converter 504 can be controlled according to a converter control signal CCS. In one embodiment, the charger controller 508 provides the charger control signal CCS to the AC to DC converter 504 according to the status of the battery pack 514. As such, the output of the AC to DC converter 504 can be regulated according to the status of the battery pack 514.

In block 750, a battery voltage can be compared with a predetermined minimum battery voltage. If the battery voltage is less than the predetermined minimum battery voltage, the charging control switch is controlled by a switch control signal SCS to charge the battery pack in a continuous charging mode in block 760, in one embodiment. In one embodiment, the continuous charging mode enables the battery charging circuit 600 to charge the battery pack 514 in a pre-conditioning stage. In the continuous charging mode, the charging control switch 506 transfers the charge power in a linear mode and the battery pack 514 is charged by a pre-conditioning current. If the battery voltage is greater than the predetermined minimum battery voltage, the charging control switch is controlled by the switch control signal SCS to charge the battery pack in a pulse charging mode in block 770, in one embodiment. In one embodiment, the charging control switch 506 transfers the charge power in a switch mode while the battery pack 514 is charged in the pulse charging mode. In this instance, the AC to DC converter 504 can provide a constant current or a constant voltage for charging the battery pack 514 according to a status of the battery pack.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

What is claimed is:

1. A battery charging circuit comprising:
an alternating current (AC) to direct current (DC) converter operable for providing a charging power to a battery pack;
a charging control switch coupled between said AC to DC converter and said battery pack operable for transferring said charging power to said battery pack in a continuous charging mode and a pulse charging mode; and
a charger controller operable for generating a node voltage signal at a node and for providing a converter control signal to control an output of said AC to DC converter according to said node voltage signal, and for providing a switch control signal to control said charging control switch according to a status of said node voltage signal in said continuous charging mode and providing said switch control signal according to a pulse signal in said pulse charging mode,
wherein said node senses a charging current of said battery pack to produce said node voltage signal if a battery voltage of said battery pack is lower than a predetermined battery voltage, and wherein said node senses said output of said AC to DC converter to produce said node voltage signal if said battery voltage reaches said predetermined battery voltage; and wherein said charger controller further comprises:
a current error amplifier coupled to said node and operable for comparing said charging current of said battery pack with a predetermined charging current; and
a voltage error amplifier coupled to said node and operable for comparing said output of said AC to DC converter with said predetermined battery voltage.

2. The battery charging circuit of claim 1, wherein said converter control signal selects a charging phase for said battery pack from at least a constant current phase and a constant voltage phase.

3. The battery charging circuit of claim 1, wherein said AC to DC converter is operable for providing a predetermined minimum charging voltage in a predetermined condition, and wherein said predetermined condition comprises a pre-conditioning stage, a charging termination, and an abnormal condition.

4. The battery charging circuit of claim 1, wherein said AC to DC converter, said charging control switch, said charger controller, and said battery pack constitute a single control loop.

5. The battery charging circuit of claim 1, wherein said AC to DC converter comprises a DC to DC converter operable for receiving said converter control signal from said charger controller and for regulating said output of said AC to DC converter according to said converter control signal.

6. The battery charging circuit of claim 1, wherein said battery pack is charged in said continuous charging mode if said battery voltage of said battery pack is less than a predetermined minimum battery voltage, and wherein said battery pack is charged in said pulse charging mode if said battery voltage is greater than said predetermined minimum battery voltage.

7. The battery charging circuit of claim 1, wherein said AC to DC converter provides a pre-conditioning charging current if said battery pack is charged in said continuous charging mode.

8. The battery charging circuit of claim 1, wherein said charger controller is operable for receiving an alarm signal indicative of an abnormal condition of said battery pack and for terminating a charging process of said battery pack in response to said alarm signal.

9. The battery charging circuit of claim 1, wherein said predetermined battery voltage comprises a predetermined maximum battery voltage.

10. The battery charging circuit of claim 1, wherein said charging control switch operates in said continuous charging mode if said battery voltage is lower than a predetermined minimum battery voltage and operate in said pulse charging mode if said battery voltage is higher than said predetermined minimum battery voltage.

11. The battery charging circuit of claim 1, wherein said current error amplifier is active and said voltage error amplifier is inactive if said battery voltage is lower than said predetermined battery voltage.

12. The battery charging circuit of claim 1, wherein said voltage error amplifier is active and said current error amplifier is inactive if said battery voltage reaches said predetermined battery voltage.

13. The battery charging circuit of claim 1, wherein said predetermined charging current comprises a predetermined pre-conditioning charging current if said battery voltage is lower than a predetermined minimum battery voltage.

14. The battery charging circuit of claim 1, wherein said predetermined charging current comprises a predetermined maximum charging current if said battery voltage is higher than a predetermined minimum battery voltage but lower than a predetermined maximum battery voltage.

15. The battery charging circuit of claim 1, further comprising:
a comparator for comparing said battery voltage with a predetermined minimum battery voltage; and
a selector coupled to said comparator for producing said switch control signal selected from said node voltage signal and said pulse signal according to an output of said comparator.

16. A method for charging a battery pack, comprising:
transferring a charge power from an AC to DC converter to said battery pack through a charging control switch in a continuous charging mode and a pulse charging mode;
sensing a charging current of said battery pack by a node if a battery voltage of said battery pack is lower than a predetermined battery voltage; sensing an output of said AC to DC converter by said node if said battery voltage reaches said predetermined battery voltage;
generating a converter control signal according to a node voltage signal at said node;
controlling said output of said AC to DC converter according to a said converter control signal; generating a switch control signal according to said node voltage signal in said continuous charging mode;
generating said switch control signal according to a pulse signal in said pulse charging mode;
controlling said charging control switch according to said switch control signal;
comparing said charging current of said battery pack with a predetermined charging current by a current error amplifier;
comparing said output of said AC to DC converter with said predetermined battery voltage by a voltage error amplifier; and
providing outputs of OR-tied said voltage error amplifier and said current error amplifier to said node to generate said node voltage signal.

17. The method of claim 16, wherein said converter control signal selects a charging phase for said battery pack from at least a constant current phase and a constant voltage phase according to said status.

18. The method of claim 16, further comprising:
comparing said battery voltage of said battery pack with a predetermined minimum battery voltage; and
controlling said charging control switch according to a result of said comparing.

19. A system for battery charging, comprising:
a controllable power converter for converting an AC power to a DC power; and
a charging loop coupled between said controllable power converter and a battery pack operable for generating a node voltage signal at a node, for controlling a charging control switch according to said node voltage signal to operate in a continuous charging mode and controlling said charging switch according to a pulse signal to operate in a pulse charging mode, and for regulating an output of said controllable power converter according to said node voltage signal to operate in a constant current phase and a constant voltage phase,
wherein said node senses a charging current of said battery pack to produce said node voltage signal in said constant current phase, and wherein said node senses said output of said controllable power converter to produce said node voltage signal in said constant voltage phase, said charging loop further comprises:
a current error amplifier coupled to said node and operable for comparing said charging current of said battery pack with a predetermined charging current; and
a voltage error amplifier coupled to said node and operable for comparing said output of said controllable power converter with a predetermined battery voltage.

20. A charging circuit comprising:
an alternating current (AC) to direct current (DC) converter operable for providing a charging power to a battery pack; and
a charger controller coupled between said AC to DC converter and said battery pack operable for generating a node voltage signal at a node to control an output of said AC to DC converter and to control a continuous charging of said battery pack, and for receiving a pulse signal to control a pulse charging of said battery pack,
wherein said node senses a charging current of said battery pack to produce said node voltage signal if a battery voltage of said battery pack is lower than a predetermined battery voltage, and wherein said node senses said output of said AC to DC converter to produce said voltage signal if said battery voltage reaches said predetermined battery voltage; said charger controller further comprises:
a current error amplifier coupled to said node and operable for comparing said charging current of said battery pack with a predetermined charging current; and
a voltage error amplifier coupled to said node and operable for comparing said output of said AC to DC converter with said predetermined battery voltage.

21. The charging circuit of claim 20, wherein said converter control interface comprises an optoisolator.

* * * * *